May 26, 1953 J. O. HELVERN 2,639,787
BRAKE
Filed Feb. 10, 1951 2 Sheets-Sheet 1

INVENTOR.
JAMES O. HELVERN
BY
HIS ATTORNEYS

May 26, 1953  J. O. HELVERN  2,639,787
BRAKE
Filed Feb. 10, 1951  2 Sheets-Sheet 2

INVENTOR.
JAMES O. HELVERN
BY
HIS ATTORNEYS

Patented May 26, 1953

2,639,787

UNITED STATES PATENT OFFICE 2,639,787

BRAKE

James O. Helvern, Dayton, Ohio, assignor to General Motors Corporation, Detroit, Mich., a corporation of Delaware Application February 10, 1951, Serial No. 210,301

10 Claims. (Cl. 188—79)

This invention relates to improvements in brakes, particularly of the internal expanding type.

It is among the objects of the present invention to provide an efficient, internal expanding brake of minimum diametral size capable of performing the work of a brake of substantially greater diameter.

This object is accomplished by arranging a plurality of smaller cooperating pairs of brake shoes side by side within a brake drum and providing mechanism which is operative concurrently to move all of the brake shoes into frictional engagement with the drum of reduced diameter.

A further object of the present invention is to provide such a reduced diameter, yet wider brake with both hydraulic and hand operated mechanisms for actuating the brake shoes.

Further objects and advantages of the present invention will be apparent from the following description, reference being had to the accompanying drawings wherein a preferred embodiment of the present invention is clearly shown.

Figure 1:
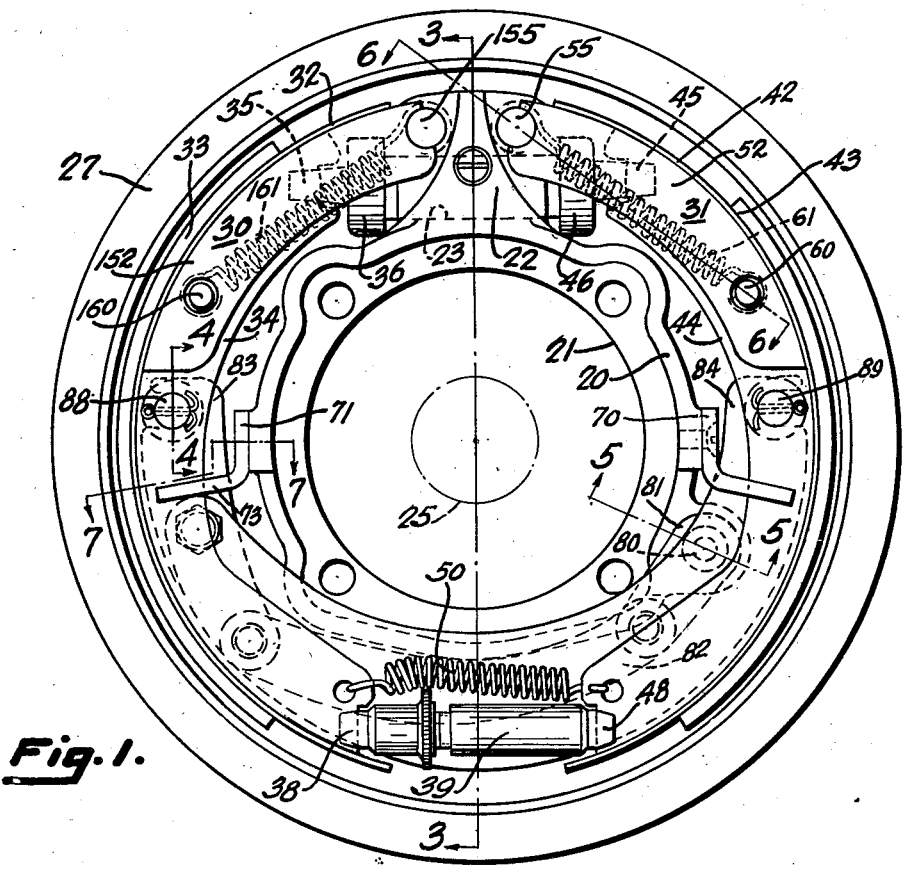
Fig. 1 is a rear view of the brake with certain parts thereof removed to disclose internal structures.

As stated, the brake of the present invention is of minimum diametral size capable of performing predetermined work. Where space is not limited, a large diameter brake providing a predetermined area of braking surface is generally used to retard rotative movement of the drum of the brake. However, where vertical space is limited and horizontal space available a brake of the present invention is more adaptable. The present brake, as has been stated, consists of a plurality of pairs of oppositely disposed brake shoes arranged side by side within a drum, mechanism being provided for moving the oppositely disposed brake shoes of each pair outwardly and into frictional engagement with the drum. The brake has a stationary housing 20 provided with a central opening 21 of any suitable size, this housing being adapted to be secured to any stationary part of the vehicle for which it forms the braking equipment. Stationary housing 20 has an integral, enlarged lug portion 22 provided with a plurality of bores 23 and 24 which extend transversely of the brake, the axis of these bores being substantially at right angles to the vertical plane passing through the axis of the brake. These bores 23 and 24 provide the interconnected cylinders of the hydraulically operated mechanism by means of which the two pairs of side by side brake shoes of the present brake may be actuated simultaneously to apply braking force through the operation of a pedal. This hydraulic mechanism for actuating brake shoes is of the standard type and need not be detailedly described in the present application.

The power driven shaft 25 shown in dot and dash lines in the present drawings extends coaxially through the opening 21 of the housing and is attached to the driving plate 26 by any suitable means. Plate 26, in the form of a disc, is anchored and secured to a rotatable brake drum 27 by means of a plurality of bolts 28 passing through openings in the plate 26 adjacent its peripheral edge and threadedly engaging the drum 27. This drum 27 is substantially coaxial of the opening 21 of the housing 20. A dust cover 21a is attached to housing 20 in any suitable manner and protects the brake against the entry of dirt.

Two diametrically opposed brake shoes are provided for each pair of shoes aligned side by side within the rotatable drum 27. In Fig. 1 the two diametrically opposite shoes 30 and 31 of one pair are shown, these shoes comprising the pair positioned at the outer end of the brake. Both brake shoes of each pair are substantially alike, and for purposes of this description the parts of the shoes alongside shoes 30 and 31 and identical therewith will be referred to by the same numerals with the suffix A added thereto. Brake shoe 30 consists of an arcuate flange 32 curved to correspond with the circular inner surface of the drum 27, the outer surface of said shoe having a lining of frictional material 33 secured thereto in any suitable manner. This lining terminates short of both ends of the brake shoe flange 32. Mid-way between the two opposite edges of the flange 32 and extending at right angles therefrom is a web 34 secured to the flange 32 in any suitable manner preferably by welding. The one end of this web terminates short of the end of flange 32 to which it is secured, this end of web 34 having a notch which receives the forked end 35 of a rod or stub shaft extending through the end cover 36 of cylinder 23 to the interior of said cylinder and is engaged by a piston, not shown, within the cylinder but forming a part of the standard hydraulically actuated wheel cylinder as is used on present day automobiles. The other end of this web portion 34, secured to the flange 32, terminates adjacent the lower end of the flange and is notched to receive the one forked end of the portion 38 of the adjustable abutment strut 39. Like brake shoe 30, brake shoe 31 has a flange 42 to which is attached a web 44, the outer peripheral surface of said flange 42 having the friction lining 43 secured thereto in any suitable manner. The upper or one end of the web 44 is notched to receive the rod or stub shaft 45 which extends through the end cover 46 at the end of cylinder 23 opposite the end cover 36, this rod or stub shaft 45 having a piston engaged thereby within this cylinder 23. Web 44 of brake shoe 31 has its lower end notched to receive the portion 48 of the abutment strut 39. Thus it may be seen that the abutment strut 39 is interposed between the adjacent ends of the webs 34 and 44 of brake shoes 30 and 31 respectively, the webs being held yieldably in engagement with the portions 38 and 48 of the abutment strut 39 by means of a spring 50, the ends of which are respectively secured to the brake shoe webs 34 and 44. The strut 39 is of standard construction and is adjustable for the purposes of varying the spacing between the lower end of the brake shoes necessary to obtain efficient shoe contact with the rotating drum.

Figure 6:
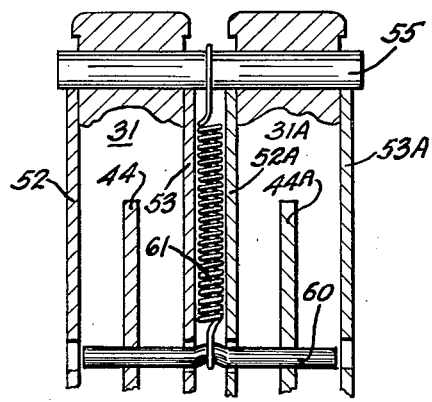
Fig. 6 is a fragmentary, detail sectional view taken along the line and in the direction of the arrows 6—6 of Fig. 1.

Fig. 6 particularly illustrates the side by side shoes 31 and 31A in fragmentary section showing that the flange of each shoe has secondary webs secured thereto, one on each side of the central web on each respective shoe. In Fig. 6 the flange 42 of the shoe 31 has a secondary web 52 secured to one side thereof and a similar web 53 secured to the flange 42 on the opposite side of the central web 44. The web 52 is disclosed in the Fig. 1 showing that one end thereof terminates short of the center between the ends of the flange 42, the opposite end of this web 52 being notched to engage the anchor pin 55. This anchor pin 55 is supported by the lug portion 22 of the stationary housing and is therefore immovable. The web portion 53 secured to the flange 42 of brake shoe 31A is identical with the web portion 52, said web portion 53 being notched to engage the stationary anchor pin 55 as does its associate web 52. These two webs 52 and 53 stiffen the upper half of the brake shoe flange 42. The brake shoe 30 has two similar secondary web portions secured to the flange 32 on opposite sides of the central web portion 34 of said brake shoe the one, 152 being the only one appearing in the drawings, see Fig. 1. Like webs 52 and 53 of the brake shoe 31 these webs 152 and its counterpart on shoe 30 are notched at their adjacent ends to engage and seat upon the anchor pin 155 also carried by and secured to the lug portion 22 of the stationary housing 20. Aligned openings in the two web portions 52 and 53 and the central web portion 44 of the brake shoe assembly 31 and similar openings in the brake shoe assembly including webs 44A—52A and 53A located along side brake shoe 31 in the drum, permit the introduction of a cross-pin 60, said cross pin fitting the openings in the central web portion 44 of brake shoe assembly 31 and the similar central web portion 44A of the brake shoe assembly alongside 31. A retractor spring 61 has its one end anchored to this pin 60, the other end of said spring being anchored to the anchor pin 55. This single retractor spring 61 thus yieldably maintains the notched ends of the respective web portions 52, 53 of shoe 31 and 52A and 53A of the brake shoe assembly 31A alongside shoe 31, in engagement with the said stationary anchor pin 55. A similar crosspin 160 extends through openings in the web portions on the flange 32, this pin 160 being engaged by one end of the retractor spring 161, the other end being secured to the stationary anchor pin 155. Thus this single retractor spring 161 yieldably maintains the two outer web portions of the brake shoe assembly 30 and the brake shoe assembly 30A positioned alongside assembly 30, in engagement with said stationary anchor pin 155. The retractor springs 61 and 161 also maintain the central ribs of the shoes 31—31A and 30—30A in engagement with the respective wheel cylinder rods or stub shafts.

As has been stated, wheel cylinder 23 is a part of the hydraulic mechanism which actuates brake shoes 30 and 31 while the mechanism in wheel cylinder 24 actuates the two brake shoe assemblies 30A and 31A arranged side by side with said brake shoe assemblies 30 and 31.

Figure 7:
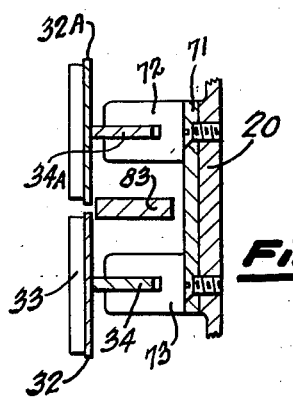
Fig. 7 is a similar section taken along the line and in the direction of the arrows 7—7 of Fig. 1.

To hold the brake shoes in proper position longitudinally of the axis of the brake and still permit all shoes to move freely radially and circumferentially throughout a limited range, brackets 70 and 71 are securely fastened to the stationary housing 20. Each bracket consists of a base providing spaced forked portions 72 and 73 which fit over the respective central ribs of the adjacent brake shoe assemblies 30 and 30A. The section Fig. 7 shows the bracket portion 73 fitting over and about the central web 34 of the brake shoe assembly 30, the bracket portion 72 fitting about the central web portion 34A of the brake shoe assembly 30A alongside the brake shoe 30. The bracket 70 is identical with the bracket 71 and shows one forked portion thereof fitting about the central web portion 44 of the brake shoe assembly 31. The associate forked portion on bracket 70 fits over the central web portion of the brake shoe assembly 31A arranged aside of the assembly 31 within the drum.

It may readily be seen that if hydraulic pressure actuating medium is introduced into both the interconnected cylinders 23 and 24 between the respective pistons therein the plungers 35 and 45 of one cylinder mechanism and the corresponding plungers of the associated cylinder mechanism are urged outwardly thereby urging their respective shoe assemblies 31 and 30 and the shoe assemblies 31A and 30A, arranged side by side therein, outwardly against the effect of the retractor springs 161 and 61 causing the frictional lining on the respective brake shoes to engage the drum 27. The action of the brake shoes, this brake being of the well known self-energizing brake type, will cause the one brake shoe assembly acting through the strut 39 to exert a limited turning movement of the associate brake shoe assembly dependent upon the rotation of the drum. As before stated, the hydraulic mechanism within the wheel cylinders 23 and 24, is controlled by the operation of a pedal actuated master cylinder which in all standard hydraulic braking systems provides the hydraulic pressure medium to operate said wheel cylinder mechanism.

The present brake is also equipped with hand operated mechanism whereby the brakes may be actuated to apply braking force by the operation of a hand operated lever. This mechanism consists of a shaft 80 rotatably supported in the housing 20 and extending from the brake to permit application thereto of proper linkage operatively connected to the hand operated lever not shown in the present drawings. This shaft 80, rotatably supported by the stationary housing 20, is clearly illustrated in the Figs. 2 and 5. The inner end of shaft 80 terminates adjacent the level of the space between aligned brake shoes and has the lever 81 anchored thereto so that said lever moves with the shaft 80 when it is rotated.

Figures 3, 4, 5:
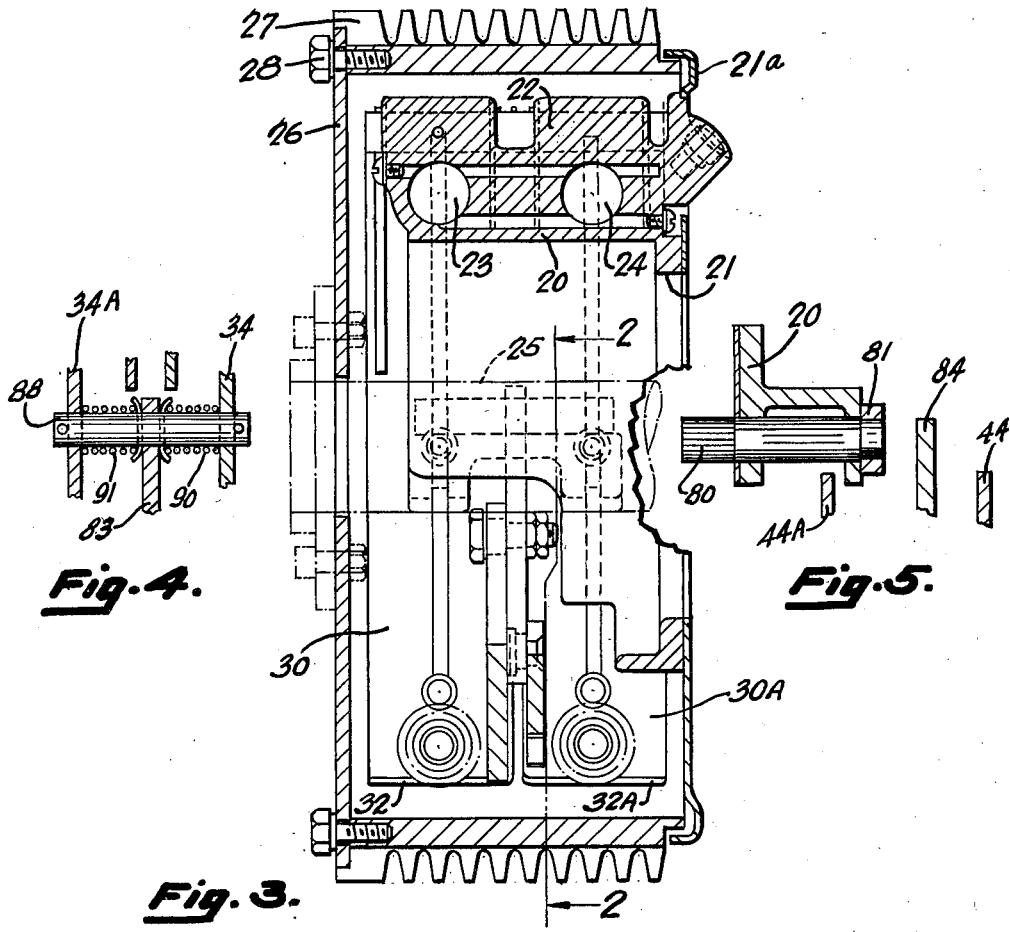
Fig. 3 is a transverse sectional view taken along the line and in the direction of the arrows 3—3 of Fig. 1. Certain parts are omitted for sake of clarity.
Fig. 4 is a fragmentary detail section taken along the line and in the direction of the arrows 4—4 of Fig. 1.
Fig. 5 is a fragmentary section taken along the line and in the direction of the arrows 5—5 of Fig. 1.

Lever 81 has its free end hingedly secured to one end of a link 82, the opposite end of this link 82 being secured to another lever 83. This lever 83 has a notch at the end opposite its connection with link 82, this notch receiving and fitting over a pin 88 which extends through aligned openings in the central web portions of the brake shoe assembly 31 and the brake shoe assembly 31A arranged alongside it. A strut 84 has its one end hingedly secured to lever 83 at a point substantially midway between its hinged connection with link 82 and its point of engagement with the pin 88. The opposite end of strut 84, that is, the end not secured to lever 83, has a notch similar to lever 83 which fits over and about the pin 89. Pin 89, like pin 88, extends through openings in the web 44 of the shoe 31 and a similar web of its associate shoe 31A. Fig. 4 illustrates this pin 88 engaged by the recess portion of lever 83 and extending through openings in the central web portion 34 of brake shoe assembly 30 and the corresponding web portion 34A of the brake shoe assembly 30A aligned along said brake shoe assembly 30 within the drum 27. Springs 90 and 91 surrounding the pin 88 between the webs 34 and 34A urge abutment washers on said pin into engagement with opposite sides of lever 83 thereby holding said strut in proper position relatively to the ends of the shaft or pin 88. The pin 89 engaged by strut 84 is equipped with similar springs to hold lever 84 in proper position relatively to the ends of the pin 89. The levers, strut and link as illustrated in Fig. 2 are all arcuated in order to provide safe clearance of the driving shaft 25 which extends through the central portion of the brake.

Figure 2:
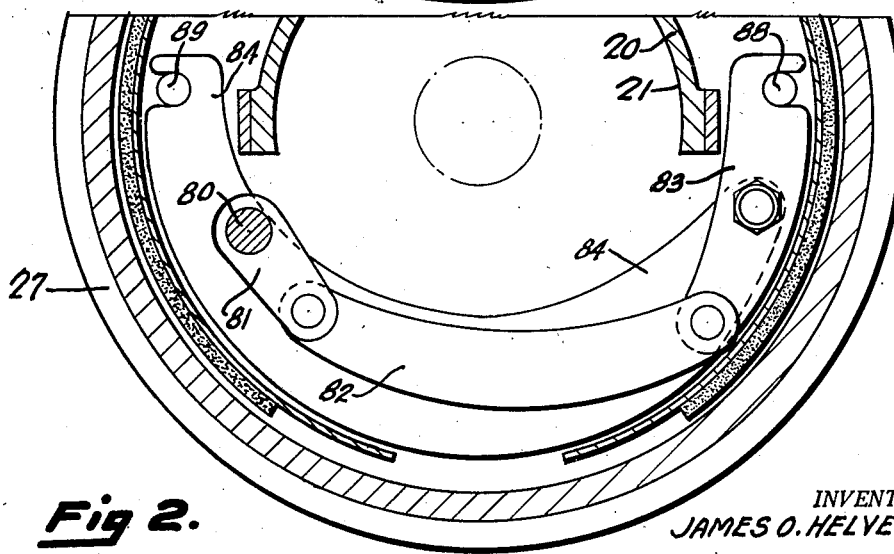
Fig. 2 is a fragmentary sectional view of the brake, taken along the line and in the direction of the arrows 2—2 of Fig. 3. This view is intended more clearly to illustrate arrangement of certain levers and therefore other elements of the brake have been deleted.

When the hand lever, mechanically connected in any well known manner, with the shaft 80, is rotated, for instance in a manner to rotate shaft 80 clockwise as regards Fig. 2, lever 81 will be actuated clockwise to exert a pull on the link 82 said link exerting a similar effort on the lever 83. The pull on lever 83, with the hinge connection with strut 84 acting as a pivot, will cause the lever 83 to be moved clockwise and exert a push upon the pin 88 and thereby urge the shoe assembly 30 and its aligned assembly 30A also connected with pin 88, into engagement with the rotating drum 27. Continued pull on the link 82 and lever 83 with the brake shoes connected to pin 88 in drum engagement, will cause lever 83 to move clockwise about pin 88 as a pivot, thereby exerting a pushing effort upon the strut 84 moving it against pin 89 to urge the connected shoes 31 and its aligned shoe 31A into engagement with the rotating drum. If the pulling link 82 first acts through lever 83 to move the strut 84 against its pin 89 and cause the shoes 31 and 31A first to engage the rotating drum, then the hinge connection between levers 83 and 84 will act as a pivot causing the pull of the link 82 to rotate the lever 83 clockwise as regards Fig. 2 so that its recessed end will push upon pin 88 to move the shoes 30 and 30A into engagement with the rotating drum. The links are so arranged that any self-energizing movement of the brake circumferentially to a limited degree will in no way affect the functional operation of this group of interconnected and superposed levers.

From the aforegoing description it will be clear that applicant has provided a compact and efficient brake requiring lesser diametral space. The reduced diameter drum, wider than the ordinary drum, embraces a plurality of sets of aligned, internally expanding brake shoes. The rigid stationary housing which rigidly supports the brake upon the vehicle for which it forms braking equipment provides also the housing portions of the necessary hydraulic actuated wheel cylinder mechanisms for all of the contained brake shoes and also a support for the immovable anchor pins engaged by the opposing shoes of the various pairs of shoes. The two adjacent shoes of two sets of shoes are yieldably maintained against the stationary anchor pin by a single retractor spring, while adjustable abutment struts are provided between opposite adjacent ends of the two opposed shoes of each set. Mechanism within the brake connects with the aligned shoes of each set, this mechanism being actuated by a single shaft rotatably supported by the stationary housing and mechanically connected for rotation to any suitable hand operated lever whereby all of the shoes are concurrently actuated to exert a braking effort by the single, hand actuated mechanism.

While the embodiment of the present invention as herein disclosed, constitutes a preferred form, it is to be understood that other forms might be adopted.

What is claimed is as follows:

1. In an internally expanding brake, the combination with a stationary housing; of a rotatable drum about said housing; two separate pairs of diametrically opposed brake shoes arranged side by side within said drum; two rigid anchors provided by the housing and engaged by adjacent ends of the pairs of brake shoes; an anchor strut engaged by and supported between the opposite adjacent ends of each pair of the shoes; a single pin loosely supported between the side by side shoes of said two pairs of shoes; a single resilient means attached to each pin and urging the respective shoes into engagement with both anchors and anchor struts; a rotatable shaft supported by the housing; and motion transmitting means connected between the said shaft and the brake shoes, said means comprising an abutment pin secured to the side by side shoes of said pairs of shoes, a plurality of flat, superposed and interconnected links and levers cooperative to translate the rotary motion of the shaft into a pushing motion in opposed directions radially outwardly toward the drum and against the respective abutment pins of said side by side brake shoes to move said shoes into frictional engagement with the drum.

2. In an internally expanding brake, the combination with two pairs of side by side, oppositely disposed brake shoes adapted simultaneously to be moved into frictional engagement with a surrounding, rotating brake drum, of manually operable mechanism for moving said shoes into braking engagement with the drum, said mechanism consisting of a shaft journaled in the brake so as to be rotatable only, a lever attached to said shaft to rotate therewith, a link having one end hingedly attached to the free end of said lever, a second lever having one end hingedly attached to the other end of said link, the opposite end of the lever engaging an abutment pin secured to the two adjacent shoes of said pairs of the brake shoes, a strut having one end hingedly secured to said second lever substantially midway of its ends, said strut having its other end engaging an abutment pin supported by the two other side by side brake shoes, stationary anchor pins engaged by the adjacent ends of said pairs of brake shoes; adjustable abutment struts engaged by the opposite adjacent ends of said pairs of brake shoes; and resilient means interposed between the two pairs of brake shoes and the stationary anchor pins and the two ends of the pairs of shoes engaging the adjustable struts.

3. In an internally expanding brake, the combination with a rotatable drum; of a stationary housing having a central hub portion provided with an opening concentric of the drum through which the driving element for the drum may extend; diametrically opposed brake shoes movable to engage the drum; a rotatable shaft journaled in the stationary housing; a lever anchored to said shaft so as to rotate therewith; a link, arcuated to clear the drum rotating element, said link having its one end pivotally secured to said lever; a second lever, one end of which is pivotally secured to the other end of the link, the other end of said second lever engaging the one brake shoe substantially intermediate its ends; a strut, crescent shaped to clear the drum rotating element, one end of said strut being pivotally secured to the second lever substantially intermediate its ends, the other end of the strut engaging the other brake shoe substantially intermediate its ends; anchor pins supported by the housing and respectively engaged by the adjacent ends of the brake shoes; a tension spring anchored to each anchor pin respectively and to its engaging brake shoe; an anchor strut interposed between the adjacent ends of the brake shoes opposite the anchor pins; a tension spring anchored between the brake shoes adjacent the anchor strut; and rigid brackets secured to the housing and engaging and supporting the brake shoes so as to permit movement thereof radially and circumferentially of the drum.

4. A device in accordance with claim 3 in which; however, the stationary housing, by means of which the brake is attached to the vehicle providing the drum rotating element, has a cylinder formed therein said cylinder supporting the hydraulically operated mechanism engaging the brake shoes adjacent the anchor pins and operative to actuate said shoes to engage the drum, the housing also supporting a dust cover for the brake assembly.

5. In a unitary, internally expanding brake, the combination with a rotatable drum; of a stationary housing extending into said drum; two sets of diametrically opposed brake shoes arranged side by side within the drum and movable frictionally to engage the drum; two pins, each secured to the two adjacent brake shoes at opposite sides of the drum; a shaft journaled in the housing; a lever anchored to the shaft and rotatable thereby in a plane at right angles to the axis of the drum and substantially in alignment with the separation space between the two sets of brake shoes; a link hingedly secured at one end to the free end of the lever; a second lever hingedly attached at one end to the other end of the link, the other end of said second lever engaging the pin portion between the two brake shoes adjacent said second lever; and a strut hinged to the second lever and engaging the center of the pin attached to the opposite two shoes and adjacent said strut; stationary anchor pins engaged by two adjacent ends of both sets of brake shoes; anchor struts interposed between the other two adjacent ends of both sets of brake shoes; and resilient means yieldably urging the shoes into engagement with their respective anchor pins and struts.

6. In a unitary, internally expanding brake, the combination with a rotatable drum, of a stationary housing extending into said drum; two sets of diametrically opposed brake shoes arranged side by side within the drum and movable frictionally to engage the drum; two pins, each pin engaging and connecting the two, side by side brake shoes; a shaft journaled in the housing, the axes of said shaft and the drum being substantially parallel, one end of said shaft extending from the brake, the other end terminating in a plane passing between the two sets of brake shoes; a group of cooperating levers and links between the shaft and the two pins, operative by rotation of the shaft to actuate the pins for moving all of the brake shoes into frictional engagement with the drum; anchor means provided by the housing and engaged by adjacent ends of the brake shoes; an anchor strut interposed between the opposite adjacent ends of each set of brake shoes; a tension spring connected between the two shoes of each set, adjacent the anchor strut; a single spring connected respectively between the anchor means on the housing and each two, side by side brake shoes; and dual, hydraulically operated actuators carried in the housing, each actuator operatively engaging a set of brake shoes, said actuators being concurrently operative to urge the respective shoes into drum engagement.

7. In a dual internally expanding brake, the combination with a stationary housing; of a rotatable drum about said housing; two separate sets of diametrically opposed brake shoes arranged side by side within the drum, each shoe consisting of an arcuate flange portion upon which a friction lining is attached so as to be engageable with the drum, each flange having a central, inwardly extending angular web terminating short of the ends of the flange and having also two, side web portions attached to the flange adjacent its outer edges and parallel to the central web and extending from beyond one end of the flange and terminating short of half way of its length; two anchor pins carried by the housing, each pin being respectively engaged by the ends of the two side web portions of each side by side brake shoe; an abutment strut interposed between and engaged by the adjacent ends of the central webs on the two shoes of each set respectively; a spring connected between each two webs engaging the respective struts, yieldably urging the webs upon their respective struts; a cross pin secured to the two central webs of each two side by side brake shoes, each cross pin extending through clearance openings in the adjacent side webs on said two side by side shoes; a single tension spring interposed between each anchor pin and the cross pin carried by the shoes engaging the respective anchor pin, said spring extending between the two adjacent side webs of the respective side by side shoes; dual hydraulically operated means in the housing, each means engaging the central web of the two shoes of each set of shoes, said means being operative concurrently to actuate all of the shoes toward and into frictional engagement with the drum; a shaft journaled in the housing, said shaft being manually rotatable; an abutment pin supported by the two central webs of both side by side brake shoes respectively, substantially midway of their ends; and a plurality of cooperating and connected levers, one of which is anchored to the shaft to be rotated thereby, the second lever being connected to said one lever, and the third and fourth of said levers being connected together and to the second lever and respectively engaging the said abutment pins for actuating the respective shoes into drum engagement by rotation of said shaft.

8. A brake in accordance with claim 7 in which, the housing rigidly supports a plurality of forked brackets, each of which fits over a central web portion of a brake shoe for supporting the shoe and holding it movably in proper position within the drum, substantially all of said levers being arcuated to follow the contour of the drum and thereby clear drum rotating mechanism adapted to extend through the housing into the brake.

9. In an internally expanding brake, the combination with a stationary housing, of a rotatable drum about said housing, a plurality of pairs of oppositely disposed brake shoes arranged in substantially coaxial alignment within said drum; two anchor pins in the housing, one pin being engageable by the corresponding ends of the aligned brake shoes on one side of the center of the drum, the other pin being engageable by the adjacent, corresponding ends of the aligned brake shoes on the opposite side of the center of the drum; means yieldably holding the shoes against the respective anchor pin; an abutment strut interposed between and engaged by the adjacent, opposite ends of each pair of brake shoes respectively; means connected between each pair of brake shoes, said means being operative yieldably to hold the respective shoes against the strut interposed therebetween; two attachment pins, each respectively engaging all of the shoes aligned on one side of the drum center; and a single manually operative mechanism engaging the two attachment pins for moving all of the shoes into frictional engagement with the drum, said mechanism consisting of a train of connected levers, one of which is attached to a shaft journaled in the housing, two others of which engage and actuate a respective attachment pin.

10. A device as defined by claim 9 in which, however, the housing provides a plurality of hydraulically operated actuators, one for each pair of brake shoes, said actuators being concurrently operative to move all brake shoes into frictional engagement with the drum.

JAMES O. HELVERN.

References Cited in the file of this patent

UNITED STATES PATENTS

| Number | Name | Date |
|---|---|---|
| 1,476,314 | Whittingham | Dec. 4, 1923 |
| 1,816,595 | Lee | July 28, 1931 |
| 1,902,647 | La Brie | Mar. 21, 1933 |
| 1,919,519 | La Brie | July 25, 1933 |
| 1,943,816 | Delahaye | Jan. 16, 1934 |